(12) United States Patent
Tang (10) Patent No.: US 11,166,198 B2
(45) Date of Patent: Nov. 2, 2021

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/619,930

(22) PCT Filed: Jul. 27, 2017

(86) PCT No.: PCT/CN2017/094771
§ 371 (c)(1),
(2) Date: Dec. 5, 2019

(87) PCT Pub. No.: WO2019/019122
PCT Pub. Date: Jan. 31, 2019

(65) Prior Publication Data
US 2020/0196195 A1   Jun. 18, 2020

(51) Int. Cl.
*H04W 28/12* (2009.01)
*H04W 76/30* (2018.01)
(Continued)

(52) U.S. Cl.
CPC .......... *H04W 28/12* (2013.01); *H04L 1/1812* (2013.01); *H04L 5/0082* (2013.01); *H04W 76/30* (2018.02); *H04W 80/02* (2013.01); *H04W 80/08* (2013.01)

(58) Field of Classification Search
None
See application file for complete search history.

(56) References Cited

U.S. PATENT DOCUMENTS

2011/0170495 A1* 7/2011 Earnshaw .............. H04L 5/001
370/329
2012/0213089 A1   8/2012 Shi et al.
(Continued)

FOREIGN PATENT DOCUMENTS

CN   102055700   5/2011
CN   102984725   3/2013
(Continued)

OTHER PUBLICATIONS

Aijaz, Adnan "Packet Duplicaton in Dual Connectivity Enabled 5G Wireless Networks: Overview and Challenges" IEEE Communication Standards Magazine May 29, 2019. (Year: 2019).*
(Continued)

*Primary Examiner* — Jeffrey M Rutkowski
*Assistant Examiner* — Basil Ma
(74) *Attorney, Agent, or Firm* — Hodgson Russ LLP (57) ABSTRACT

Provided are a wireless communication method, a terminal device and a network device. The wireless communication method includes: receiving, by a terminal device, first indication information that is sent by a network device, wherein the first indication information is used to indicate the terminal device to stop duplication transmission of data of one or more radio bearers; and mapping, by the terminal device, a first logical channel to all carriers of a plurality of carriers according to the first indication information, wherein the plurality of carriers are all carriers in carriers configured by the network device for the terminal device.

14 Claims, 6 Drawing Sheets

(51) Int. Cl.
*H04L 1/18* (2006.01)
*H04L 5/00* (2006.01)
*H04W 80/02* (2009.01)
*H04W 80/08* (2009.01)

(56) References Cited

U.S. PATENT DOCUMENTS

| | | | | |
|---|---|---|---|---|
| 2012/0281564 | A1 | 11/2012 | Zhang et al. | |
| 2017/0164380 | A1 | 6/2017 | Singh et al. | |
| 2018/0279168 | A1* | 9/2018 | Jheng | H04W 28/04 |
| 2018/0324641 | A1* | 11/2018 | Tsai | H04L 69/321 |
| 2018/0368132 | A1* | 12/2018 | Babaei | H04W 80/02 |

FOREIGN PATENT DOCUMENTS

| | | |
|---|---|---|
| CN | 103201977 | 7/2013 |
| CN | 106134099 | 11/2016 |
| EP | 3627882 | 3/2020 |
| JP | 2013524613 | 6/2013 |
| RU | 2453912 C2 | 6/2012 |
| RU | 2502199 C2 | 12/2013 |
| WO | 2006102469 A1 | 9/2006 |
| WO | 2007102548 A1 | 9/2007 |
| WO | 2016028125 A2 | 2/2016 |
| WO | 2016035325 | 3/2016 |
| WO | 2018230920 | 12/2018 |

OTHER PUBLICATIONS

WIPO, ISR for PCT/CN2017/094771, dated Apr. 18, 2018.

EPO, Office Action for EP Application No. 17919586.2, dated Nov. 11, 2020.

Federal Service for Intellectual Property of Russia, First Office Action for RU2019142120, dated Sep. 3, 2020.

Ericsson, "Controlling of duplication in case of CA," 3GPP-TSG RAN WG2 #97bis, Tdoc R2-1702753, Apr. 2017, 4 pages.

Nokia et al., "Duplication Impacts to MAC," 3GPP TSG-RAN WG2 Meeting #98, R2-1704272, May 2017, 3 pages.

Sharp, "PDCP Duplication in CA," 3GPP TSG-RAN2 Adhoc Meeting, R2-1706791, Jun. 2017, 6 pages.

ZTE, "Consideration on the LCP for data duplication," 3GPP TSG-RAN WG2 Meeting #98, R2-1704666, May 2017, 5 pages.

EPO, Office Action for EP Application No. 17919586.2, dated May 14, 2020.

CIPO, Office Action for CA Application No. 3066008, dated Jan. 29, 2021.

IPI, Office Action for in Application No. 201917050985, dated Apr. 5, 2021.

Ericsson, "Further aspects of data duplication in PDCP layer," 3GPP TSG-RAN WG2 #97, Tdoc R2-1700834, Feb. 2017, 3 pages.

LG Electronics Inc., "Packet duplication in PDCP," 3GPP TSG-RAN WG2 #97, R2-1701462, Feb. 2017, 2 pages.

IPOS, Office Action for SG Application No. 11201911564U, dated Apr. 13, 2021.

CNIPA, Office Action for CN Application No. 202010059710.7, dated Apr. 27, 2021.

JPO, Office Action for JP Application No. 2020-500734, dated Aug. 10, 2021.

INAPI, Office Action for CL Application No. 201903709, dated Jul. 20, 2021.

* cited by examiner

A terminal device receives first instruction information sent by a network device, wherein the first instruction information is used for instructing the terminal device to stop copying and transmitting data of one or more wireless bearers —110

The terminal device maps a first logic channel to all carriers of a plurality of carriers according to the first instruction information, wherein the plurality of carriers are all carriers of carriers configured by the network device for the terminal device —120

WIRELESS COMMUNICATION METHOD, TERMINAL DEVICE AND NETWORK DEVICE

CROSS-REFERENCE TO RELATED APPLICATION

This application is a U.S. national phase application of International Application No. PCT/CN2017/094771, filed Jul. 27, 2017, the entire disclosure of which is incorporated herein by reference.

TECHNICAL FIELD

The present application relates to the field of communications, and more particularly, to a method for wireless communication, a terminal device, and a network device.

BACKGROUND

In the carrier aggregation scenario, the Packet Data Convergence Protocol (PDCP) may support the data duplication function, that is, duplicating one PDCP Protocol Data Unit (PDU) into two copies (possibly a plurality of copies), so as to improve the reliability of data transmission.

In the related art, in the carrier aggregation scenario, when transmitting the duplicated data, a corresponding relationship between the logical channel and the carrier for transmitting data needs to be configured, but there is no specific scheme about how to release the corresponding relationship between the logical channel and the carrier. Therefore, the logical channel is limited to certain specific carriers, resulting in low efficiency of data transmission.

SUMMARY

Embodiments of the present disclosure provide a method for wireless communication, a terminal device, and a network device. The terminal device may release a mapping relationship between a logical channel and a carrier that is pre-configured by the network device through first indication information sent by the network device, thereby the logical channel being not limited to certain specific carriers, and thus the efficiency of data transmission is improved.

In a first aspect, there is provided a method for uplink transmission, including: receiving, by a terminal device, first indication information that is sent by a network device, wherein the first indication information is used to indicate the terminal device to stop duplication transmission of data of one or more radio bearers; and mapping, by the terminal device, a first logical channel to all carriers of a plurality of carriers according to the first indication information, wherein the plurality of carriers are all carriers in carriers configured by the network device for the terminal device.

In the embodiments of the present disclosure, the terminal device can release the mapping relationship between the logical channel and the carrier through the first indication information sent by the network device, and map the logical channel to all the carriers, so that the logical channel is not limited to certain specific carriers, thus improving the efficiency of data transmission.

In combination with the first aspect, in a first implementation of the first aspect, the method further includes: mapping, by the terminal device, a second logical channel after a relationship between the first logical channel and the second logical channel is released to all carriers of the plurality of carriers according to the first indication information.

In combination with the first aspect or the first implementation of the first aspect, in a second implementation of the first aspect, before the mapping, by the terminal device, the first logical channel to all carriers of the plurality of carriers according to the first indication information, the method further includes: releasing, by the terminal device, a relationship between the first logical channel and a second logical channel according to the first indication information, and before releasing the relationship between the first logical channel and the second logical channel, the second logical channel being configured to transmit duplicated data of data of the first logical channel.

In combination with the first aspect or any one of the first and second implementations of the first aspect, in a third implementation of the first aspect, the releasing, by the terminal device, the relationship between the first logical channel and the second logical channel according to the first indication information includes: transmitting first data through the first logical channel, transmitting second data through the second logical channel, or stopping transmitting data through the second logical channel, by the terminal device.

In combination with the first aspect or any one of the first to third implementations of the first aspect, in a fourth implementation of the first aspect, before mapping, by the terminal device, the first logical channel to all carriers of the plurality of carriers according to the first indication information, the method further includes: releasing, by the terminal device, a pre-configured mapping relationship between the first logical channel and the first carrier according to the first indication information.

In combination with the first aspect or any one of the first to fourth implementations of the first aspect, in a fifth implementation of the first aspect, before mapping, by the terminal device, the second logical channel to all carriers of the plurality of carriers according to the first indication information, the method further includes: releasing, by the terminal device, a pre-configured mapping relationship between the second logical channel and a second carrier according to the first indication information.

In combination with the first aspect or any one of the first to fifth implementations of the first aspect, in a sixth implementation of the first aspect, the method further includes: sending, by the terminal device, second indication information to the network device, wherein the second indication information is used to indicate that the terminal device has released the first logical channel to all carriers of the plurality of carriers and/or the terminal device has released the second logical channel to all carriers of the plurality of carriers.

In combination with the first aspect or any one of the first to sixth implementations of the first aspect, in a seventh implementation of the first aspect, the mapping, by the terminal device, the first logical channel to all carriers of the plurality of carriers according to the first indication information includes: mapping, by the terminal device, the first logical channel to all carriers of the plurality of carriers within a preset time interval after receiving the first indication information.

In combination with the first aspect or any one of the first to seventh implementations of the first aspect, in an eighth implementation of the first aspect, the first indication information is carried in a Media Access Control Control Element (MAC CE).

In a second aspect, there is provided a method for wireless communication, including: sending, by a network device, first indication information to a terminal device, wherein the first indication information is used to indicate the terminal device to stop duplication transmission of data of one or more radio bearers and indicate the terminal device to map a first logical channel to all carriers of a plurality of carriers, wherein the plurality of carriers are all carriers in carriers configured by the network device for the terminal device.

In combination with the second aspect, in a first implementation of the second aspect, the first indication information is further used to indicate the terminal device to map a second logical channel after a relationship between the first logical channel and the second logical channel is released to all carriers of the plurality of carriers.

In combination with the second aspect or the first implementation of the second aspect, in a second implementation of the second aspect, the method further includes: receiving, by the network device, second indication information that is sent by the terminal device, wherein the second indication information is used to indicate that the terminal device has released the first logical channel to all carriers of the plurality of carriers and/or the terminal device has released the second logical channel to all carriers of the plurality of carriers.

In combination with the second aspect or any one of the first and second implementations of the second aspect, in a third implementation of the second aspect, the first indication information is carried in a Media Access Control Control Element (MAC CE).

In a third aspect, there is provided a terminal device, including one or more modules for executing each method embodiment in the first aspect.

In a fourth aspect, there is provided a network device, including one or more modules for executing each method embodiment in the second aspect.

In the fifth aspect, there is provided a terminal device, including a memory and a processor, where the memory is used for storing program codes, and the processor is used for invoking the program codes to implement the methods in the above first aspect and the respective implementations of the first aspect.

In the sixth aspect, there is provided a network device, including a memory and a processor, where the memory is used for storing program codes, and the processor is used for invoking the program codes to implement the methods in the above second aspect and the respective implementations of the second aspect.

In a seventh aspect, there is provided a computer readable medium for storing program codes executable by the terminal device, where the program codes includes instructions for implementing the methods in the above first aspect and the respective implementations of the first aspect.

In an eighth aspect, there is provided a computer readable medium for storing program codes executable by the terminal device, where the program codes includes instructions for implementing the methods in the above second aspect and the respective implementations of the second aspect.

In a ninth aspect, there is provided a system chip, including an input-output interface, at least one processor, at least one memory and a bus, where the at least one memory is used for storing codes, and the at least one processor is sued for invoking the codes of the at least one memory to perform operations of the above-mentioned various aspects.

DETAILED DESCRIPTION

The technical solutions in the embodiments of the present application will be clearly and completely described below with reference to the accompanying drawings in the embodiments of the present application.

It should be understood that the technical solutions of the embodiments of the present application may be applied to various communication systems, such as a Global System of Mobile communication (GSM), a Code Division Multiple Access (CDMA) system, a Wideband Code Division Multiple Access (WCDMA) system, General Packet Radio Service (GPRS), a LTE system, a LTE Frequency Division Duplex (FDD) system, LTE Time Division Duplex (TDD), a Universal Mobile Telecommunication System (UMTS), a Worldwide Interoperability for Microwave Access (WiMAX) communication system, a New Radio (NR), or a future 5G system, and the like.

In particular, the technical solutions of the embodiments of the present application may be applied to various communication systems based on non-orthogonal multiple access technology, such as a Sparse Code Multiple Access (SCMA) system, a Low Density Signature (LDS) system, etc., and the SCMA system and the LDS system may also be referred to as other names in the communication field; further, the technical solutions of the embodiments of the present application may be applied to a multi-carrier transmission system using the non-orthogonal multiple access technology, such as an Orthogonal Frequency Division Multiplexing (OFDM) system, a Filter Bank Multi-Carrier (FBMC) system, a Generalized Frequency Division Multiplexing (GFDM) system, a Filtered-OFDM (F-OFDM) system, and the like using the non-orthogonal multiple access technology.

The terminal device in the embodiments of the present application may refer to user equipment (UE), an access terminal, a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication capability, a computing device or other processing devices connected to a wireless modem, an in-vehicle device, a wearable device, a terminal device in a future 5G network, or a terminal device in a future evolution of a Public Land Mobile Network (PLMN), etc., which is not limited in the embodiments of the present application.

The network device in the embodiments of the present application may be a device for communicating with the terminal device. The network device may be a Base Transceiver Station (BTS) in the GSM or the CDMA, or a base station (NodeB, NB) in the WCDMA system, or an Evolutional NodeB (eNB or eNodeB) in the LTE system, or a wireless controller in a Cloud Radio Access Network (CRAN) scenario, or the network device may be a relay station, an access point, an in-vehicle device, a wearable device, and a network device in a future 5G network or a network device in a future evolved PLMN network, which is not limited in the embodiments of the present application.

Figure 1:
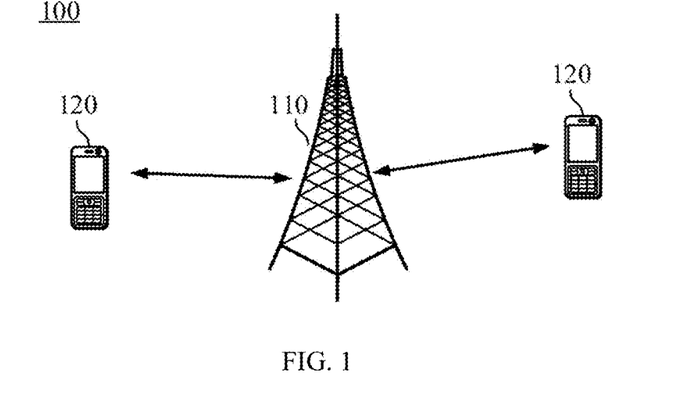
FIG. 1 is a schematic architectural diagram of a wireless communication system according to an embodiment of the present disclosure.

FIG. 1 shows a schematic architectural diagram of a wireless communication system 100 according to an embodiment of the present disclosure. The wireless communication system 100 may include a network device 110. The network device 110 may be a device that communicates with a terminal device. The network device 110 may provide communication coverage for a particular geographic area and may communicate with the terminal device (e.g., UE) located within the coverage area. Optionally, the network device 110 may be a base station (Base Transceiver Station, BTS) in the GSM system or the CDMA system, or may be a base station (NodeB, NB) in the WCDMA system, or may be an evolved base station (Evolutional Node B, eNB or eNodeB) in the LTE system, or a wireless controller in a Cloud Radio Access Network (CRAN), or the network device may be a relay station, an access point, an in-vehicle device, a wearable device, a network side device in a 5G network or a network device in a further evolved Public Land Mobile Network (PLMN).

The wireless communication system 100 also includes at least one terminal device 120 located within the coverage of the network device 110. The terminal device 120 may be mobile or fixed. Optionally, the terminal device 120 may refer to an access terminal, a User Equipment (UE), a subscriber unit, a subscriber station, a mobile station, a mobile stage, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with wireless communication function, a computing device or other processing devices connected to a wireless modem, an in-vehicle device, a wearable device, a terminal device in the 5G network, or a terminal device in future evolved PLMN, and the like.

Optionally, Device to Device (D2D) communication may be performed between the terminal devices 120.

Optionally, the 5G system or network may also be referred to as a New Radio (NR) system or network.

As shown in FIG. 1, optionally, the wireless communication system 100 may include a plurality of network devices and may include other numbers of terminal devices in the coverage of the network device, which is not limited by the embodiment of the present disclosure.

In the carrier aggregation scenario, PDCP may support the data duplication function, that is, by utilizing the function of duplicating data of PDCP, the duplicated data corresponds to two or more logical channels, and finally it is ensured that a plurality of duplicated PDCP PDUs (they are the same) are capable of being transmitted in different aggregation carriers of the physical layer, so as to achieve frequency diversity gain and thus to improve reliability of data transmission.

Figure 2:
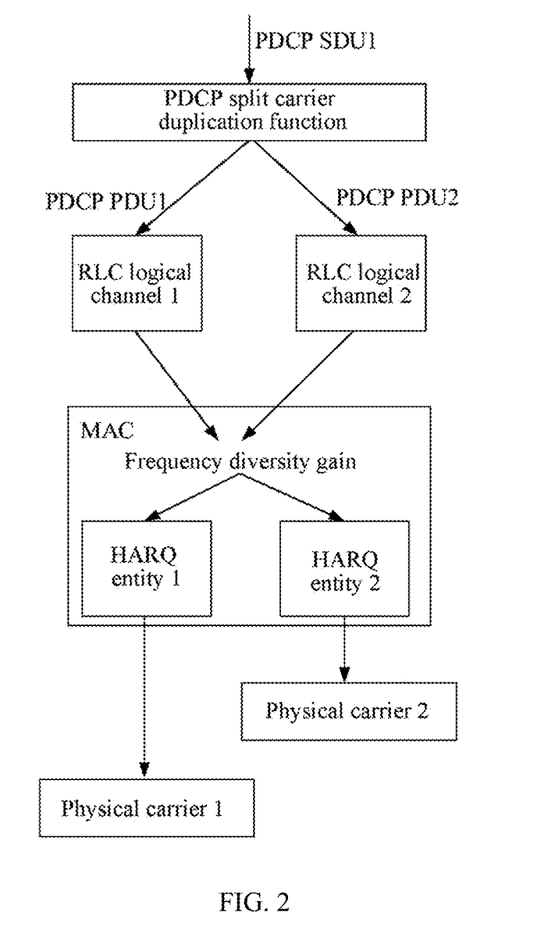
FIG. 2 is a protocol architecture diagram of a duplicated data transmission in a carrier aggregation scenario according to an embodiment of the present disclosure.

For ease of understanding, how to schedule the duplicated data on different physical carriers will be briefly described below with reference to FIG. 2. As shown in FIG. 2, the PDCP layer has a split bearer duplication function, and duplicates and packages the data process of the PDCP Service Data Unit (SDU) into PDCP PDU1 and PDCP PDU2, PDCP PDU1 and PDCP PDU2 having the same content, that is, the carried data (payload) and the header being the same. PDCP PDU1 and PDCP PDU2 are respectively mapped to different Radio Link Control (RLC) entities, and the RLC entities place PDCP PDU1 and PDCP PDU2 on different logical channels (a logical channel 1 and a logical channel 2). For a Media Access Control (MAC), after learning which logical channels transmit the duplicated data of the same PDCP PDU, the duplicated data is transmitted on different carriers through different Hybrid Automatic Repeat reQuest (HARQ) entities. For example, the duplicated data carried in the logical channel 1 is transmitted on the physical carrier 1 through the HARQ entity 1, and the duplicated data carried in the logical channel 2 is transmitted on the physical carrier 2 through the HARQ entity 2.

Those skilled in the art should understand that the PDCP data duplication function may be configured based on a Radio Bearer (RB), that is, different RBs may be configured to support PDCP duplication data transmission, or no PDCP duplication data transmission is configured.

RB is a general term for a series of protocol entities and configurations allocated by a base station for the terminal device, including a PDCP protocol entity, an RLC protocol entity, a series of resources allocated by a MAC and a physical layer (PHY), and the like. The RB includes a Signaling Radio Bearer (SRB) and a Data Radio Bearer (DRB). The SRB is a channel through which the signaling message of the system is actually transmitted. The DRB is a channel through which the user data is actually transmitted.

Figure 3:
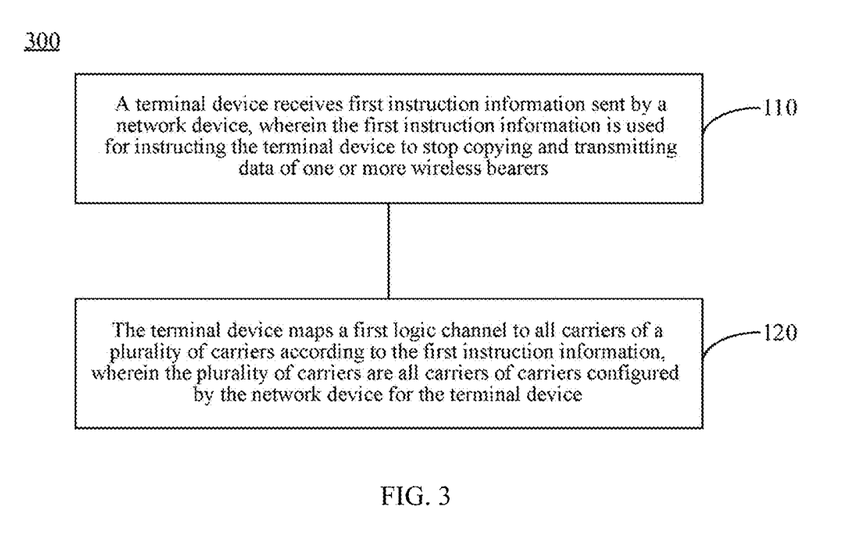
FIG. 3 is a schematic flowchart of a method for wireless communication according to an embodiment of the present disclosure.

FIG. 3 is a schematic flowchart of a method 300 for wireless communication according to an embodiment of the present disclosure. As shown in FIG. 3, the method 300 includes some or all of the following steps.

In 310, the terminal device receives first indication information sent by the network device, where the first indication information is used to instruct the terminal device to stop the duplication transmission of the data of one or more radio bearers.

In 320, the terminal device maps, according to the first indication information, a first logical channel to all carriers of a plurality of carriers, where the plurality of carriers are all carriers in carriers configured by the network device for the terminal device.

Specifically, in the embodiments of the present disclosure, by receiving the indication information sent by the network device, the terminal device stops the duplication transmission of data of one or more radio bearers, and maps the first logical channel to all the carriers in the plurality of carriers configured by the network device, so that the first logical channel can transmit data on the plurality of carriers, thereby increasing the rate of data transmission.

It should be understood that the first logical channel is a logical channel under one or more radio bearers. When the radio bearer is one, the first logical channel may be a plurality of logical channels under the one radio bearer, or may be one logical channel under the one radio bearer; and when the number of radio bearers is multiple, the first logical channel may be one logical channel under each radio bearer of the plurality of radio bearers, or may be a plurality of logical channels under each of the plurality of radio bearers.

That is, the first logical channel may be a plurality of logical channels, or may be one logical channel.

Optionally, after receiving the first indication information, the terminal device may immediately release the mapping relationship established when transmitting the data by using the duplication data transmission manner.

For example, when the data is transmitted using the duplication data transmission manner, the logical channel LCH 1 is used to transmit data information, and the logical channel LCH 2 is used to transmit the duplicated data of the data information of the logical channel LCH 1. At this time, the logical channel LCH 1 is mapped to a carrier 1, and the logical channel 2 is mapped to a carrier 2. After the terminal device receives the first indication information, the terminal device may immediately release the above relationship between the logical channel LCH 1 and the logical channel LCH 2. After the release, the logical channel LCH 2 is no longer used to transmit the duplicated data of the data of the logical channel LCH 1, and the terminal device may also release the mapping relationship between the logical channel LCH 1 and the carrier 1 and the mapping relationship between the logical channel LCH 2 and the carrier 2.

It should be understood that the "release" here refers to removing the mapping relationship pre-configured by the network device, or the mapping relationship pre-configured by the network device being no longer existing.

That is to say, after the terminal device receives the first indication information, the terminal device may release or remove the mapping relationship established when transmitting the data by using the duplication transmission mode by default.

Optionally, the first indication information may be carried in a Media Access Control Control Element (MAC CE).

Optionally, after the terminal device receives the first indication information, the terminal device maps the first logical channel to all carriers of the plurality of carriers. At this time, the terminal device may not transmit data through the second logical channel, and then the terminal device may not care whether to map the second logical channel onto all of the plurality of carriers.

Optionally, after the terminal device receives the first indication information, and when the terminal device uses the second logical channel to transmit data, the data transmitted by the second logical channel is different from the data transmitted by the first logical channel. At this time, the terminal device may map the first logical channel to all of the plurality of carriers, or may map the second logical channel to all of the plurality of carriers.

That is, since the terminal device uses the first logical channel and the second logical channel to transmit different data, the terminal device may map the first logical channel and the second logical channel to all carriers respectively, and even the carriers to which the first logical channel and the second channel are mapped are the same carrier, the transmission of data on the first logical channel and the second logical channel is not affected.

Optionally, in some embodiments, before the terminal device maps the first logical channel to all of the plurality of carriers, the terminal device may first release the relationship between the first logical channel and the second logical channel. Before releasing the relationship between the first logical channel and the second logical channel, the second logical channel is a logical channel for transmitting duplicated data of data of the first logical channel, and after releasing the relationship between the first logical channel and the second logical channel, the second logical channel may be used to transmit data different from data of the first logical channel, or may not transmit data.

It should be understood that "release" herein also refers to removing the pre-configured mapping relationship of the network, for example, removing the mapping relationship of transmitting the duplicated data of the data of the first logical channel by the second logical channel. After the release, the data transmitted by the second logical channel is not related to the data transmitted by the first logical channel, that is, the data transmitted by the second logical channel may be different from the data transmitted by the first logical channel, or no data is transmitted by the second logical channel, which is not limited by the embodiments of the present disclosure.

It should be understood that the relationship between the first logical channel and the second logical channel may be configured by the network device to the terminal device using Radio Resource Control (RRC) signaling.

Optionally, before the terminal device maps the first logical channel to all of the plurality of carriers, the terminal device may further release a pre-configured mapping relationship between the first logical channel and the first carrier.

It should be understood that "release" herein also means removing the mapping relationship pre-configured by the network device, or means that the mapping relationship previously configured by the network device does not exist.

That is, the action of releasing the pre-configured mapping relationship of the network device by the terminal device may be realistic, that is, after receiving the first indication information, the terminal device may perform the operation of releasing the mapping relationship according to the first indication information, or the action may be the default of the terminal device, that is, after the terminal device receives the first indication information, it is default by the terminal device that the mapping relationship previously configured for the terminal device by the network device does not exist, which is not limited in the embodiments of the present disclosure.

It should be understood that the pre-configured mapping relationship between the first logical channel and the first carrier may be configured by the network device to the terminal device by using RRC signaling. For example, the network device may configure the logical channel LCH 1 to the carrier 1, and configure the logical channel LCH 2 to the carrier 2 through the RRC signaling, thereby avoiding confusion of data transmission due to that the contents of the data information transmitted by the logical channels are the same when different logical channels correspond to the same carrier, and improving the accuracy of data transmission.

It should be understood that the first carrier may be a carrier or a group of carriers, which is not limited in the embodiments of the present disclosure.

Therefore, the pre-configured mapping relationship between the first logical channel and the first carrier may be that one first logical channel is configured with one group of first carriers, or one first logical channel is configured with one first carrier, or each of a plurality of first logical channels is configured with one group of first carriers, or each of the plurality of first logical channels is configured with one first carrier, or other possible configurations, which are not limited by the embodiments of the present disclosure.

Optionally, before the terminal device maps the second logical channel to all of the plurality of carriers, the terminal device may further release the pre-configured mapping relationship between the second logical channel and the second carrier.

It should be understood that the data transmitted by the second logical channel herein may be the same as the data transmitted by the first logical channel, or may be different from the data transmitted by the first logical channel.

It should be understood that when the terminal device does not use the second logical channel to transmit data, the pre-configured mapping relationship between the second logical channel and the second carrier may not be released.

It should be understood that the pre-configured mapping relationship between the second logical channel and the second carrier may also be configured by the network device to the terminal device through RRC signaling.

It should also be understood that the second carrier may be a group of carriers or one carrier.

That is, the pre-configured mapping relationship between the second logical channel and the second carrier may be that one second logical channel is configured with a group of second carriers, or one second logical channel is configured with one second carrier, or each of the plurality of second logical channels is configured with one group of second carriers, or each of the plurality of second logical channels is configured with one second carrier.

When the data is transmitted by using the duplication transmission mode, the first carrier and the second carrier are different carriers or the first carrier and the second carrier are different groups of carriers, thereby avoiding confusion in data transmission due to that the terminal device transmits the same data on the same carrier or the same group of carriers, and ensuring the reliability of data transmission.

Optionally, in some embodiments, after the terminal device maps the first logical channel to all carriers of the plurality of carriers, the terminal device may further send second indication information to the network device, where the second indication information is used to indicate that the terminal device has mapped the first logical channel to all of the plurality of carriers.

Optionally, the second indication information is further used to indicate that the terminal device has mapped the second logical channel to all carriers of the plurality of carriers.

That is, after the terminal device maps the first logical channel to all carriers and/or after the terminal device maps the second logical channel to all carriers, the terminal device may notify the network device of such mapping relationship, so that the network device knows the mapping relationship of the current first logical channel and/or the mapping relationship of the second logical channel; in this way, it is possible to prevent the network device from repeating sending the first indication information to the terminal device in the case that the network device does not know the mapping relationship between the first logical channel and/or the second logical channel, which can reduce signaling overhead and reduce energy consumption.

Optionally, the second indication information may be a local variable maintained by the terminal device at the MAC layer, where the local variable corresponds to the logical channel, for example, when the local variable corresponding to the first logical channel is "0", it may be used to indicate to map the first logical channel to all of the plurality of carriers, and when the local variable corresponding to the second logical channel is "0", it may be used to indicate to map the second logical channel to all of the plurality of carriers.

Optionally, after the terminal device receives the first indication information, the terminal device may choose to immediately map the first logical channel to all carriers, or immediately map the first logical channel and the second logical channel to all of the carriers, respectively, or may map the first logical channel to all carriers after a preset time interval, or map the first logical channel and the second logical channel to all of the carriers respectively after a preset time interval.

That is, the terminal device may determine the time at which the first logical channel and/or the second logical channel are mapped to all carriers according to the time of receiving the first indication information.

For example, if the terminal device receives the first indication information on the $n^{th}$ subframe, the terminal device may map the first logical channel to all carriers on the $n^{th}$ subframe, and the terminal device may also map the first logical channel to all carriers on the $(n+k)^{th}$ subframe, where k may be a preset time interval.

Figure 4:
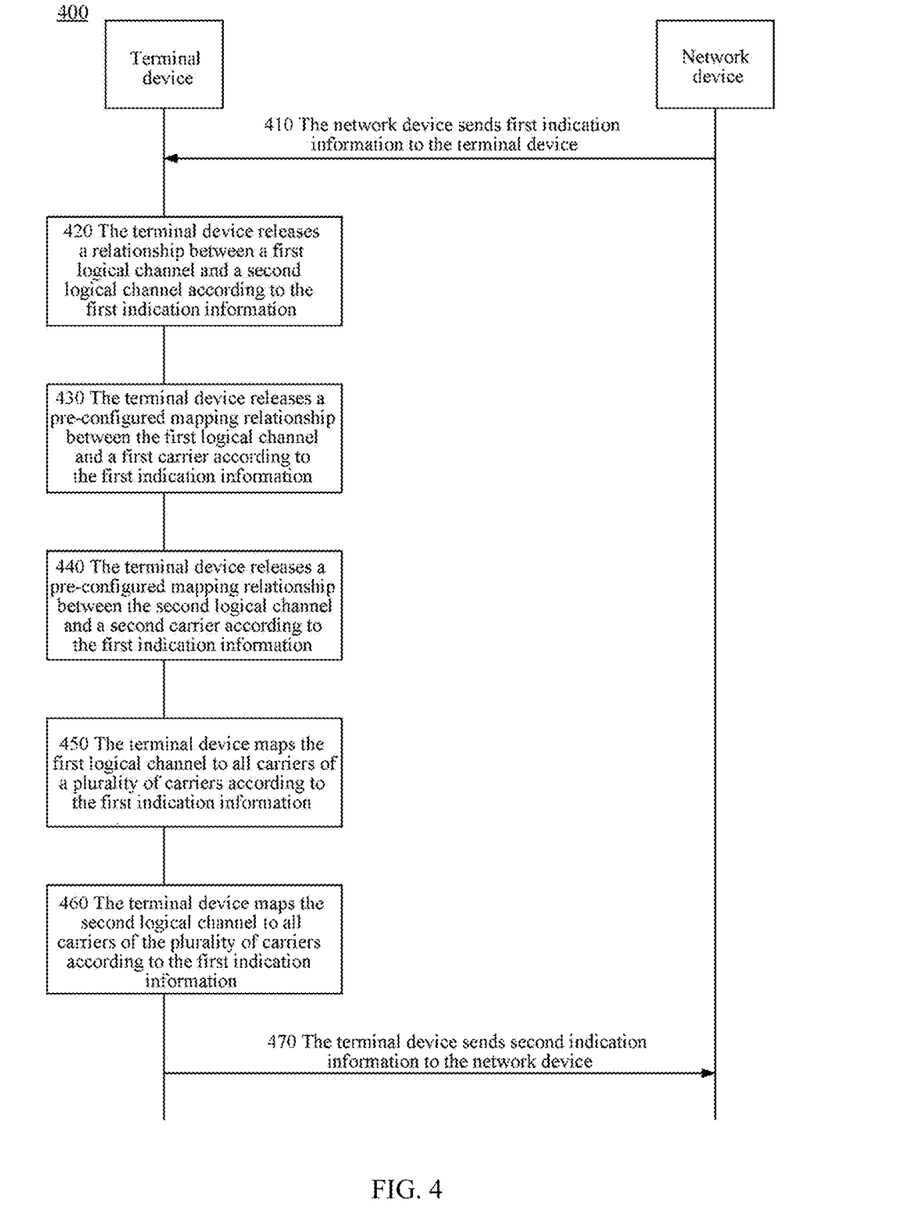
FIG. 4 is another schematic flowchart of a method for wireless communication according to an embodiment of the present disclosure.

FIG. 4 is a schematic flowchart of a method 400 for wireless communication according to an embodiment of the present disclosure. As shown in FIG. 4, the method 400 includes some or all of the following steps.

In 410, the network device sends first indication information to the terminal device.

Optionally, the first indication information is used to instruct the terminal device to stop duplication transmission of data of one or more radio bearers.

Optionally, after the terminal device receives the first indication information, it may be deemed by default that the data has been stopped to be transmitted by using the duplication transmission. In this case, the terminal device may release the data mapping relationship established when the data is transmitted by using the duplication transmission.

After the terminal device receives the first indication information, the terminal device may default that the mapping relationship previously configured by the network device does not exist, and it is unnecessary for the terminal device to perform the operation of releasing the mapping relationship, or the terminal device may release the mapping relationship pre-configured by the network device according to the first indication information. In the method 400, the mapping relationship pre-configured by the network device being released by the terminal device according to the first indication information is taken as an example, and the embodiments of the present disclosure are not limited thereto.

It should be understood that the releasing the mapping relationship may be to release the mapping relationship between the first logical channel and the second logical channel, or to release the pre-configured mapping relationship between the first logical channel and the first carrier, or to release the pre-configured mapping relationship between the second logical channel and the second carrier.

It should also be understood that "release" herein may be understood as removing the mapping relationship pre-configured by the network device, or the mapping relationship pre-configured by the network device no longer exists.

In 420, the terminal device releases a relationship between a first logical channel and a second logical channel according to the first indication information.

It should be understood that the relationship between the first logical channel and the second logical channel may be pre-configured by the network device to the terminal device through RRC signaling.

Optionally, before releasing the relationship between the first logical channel and the second logical channel, the second logical channel is configured to transmit the duplicated data of the data of the first logical channel, and after releasing the relationship between the first logical channel and the second logical channel, the second logical channel may transmit data different from the first logical channel, or may not transmit data, which is not limited by the embodiments of the present disclosure.

It should be understood that the "release" refers to removing the mapping relationship pre-configured by the network device, or the mapping relationship pre-configured by the network device no longer exists.

In 430, the terminal device releases, according to the first indication information, a pre-configured mapping relationship between the first logical channel and a first carrier.

It should be understood that the pre-configured mapping relationship between the first logical channel and the first carrier may be configured by the network device to the terminal device by using RRC signaling.

It should be understood that the first carrier may be one carrier or a group of carriers, which is not limited in the embodiments of the present disclosure.

Therefore, the configured mapping relationship between the first logical channel and the first carrier may be that one first logical channel is configured with one group of first carriers, or one first logical channel is configured with one first carrier, or each of a plurality of first logical channels is configured with one group of first carriers, or each of the plurality of first logical channels is configured with one first carrier.

It should be understood that the "release" here refers to relieving the mapping relationship pre-configured by the network device, or the mapping relationship pre-configured by the network device no longer exists.

In 440, the terminal device releases, according to the first indication information, a pre-configured mapping relationship between the second logical channel and a second carrier.

It should be understood that the pre-configured mapping relationship between the second logical channel and the second carrier may also be configured by the network device to the terminal device through RRC signaling.

It should also be understood that the second carrier may be a group of carriers or one carrier.

That is, the pre-configured mapping relationship between the second logical channel and the second carrier may be that one second logical channel is configured with one group of second carriers, or one second logical channel is configured with one second carrier, or each of the plurality of second logical channels is configured with one group of second carriers, or each of the plurality of second logical channels is configured with one second carrier.

It should also be understood that the step 440 is optional. When the terminal device does not need to use the second logical channel to transmit data, the terminal device may not release the mapping relationship between the second logical channel and the second carrier.

It should also be understood that there is no inevitable sequence between steps 420, 430, and 440, and steps 420, 430, and 440 are optional, that is, the terminal device may not perform the above three steps, and when the terminal device receives the first indication information, it may be defaulted that the mapping relationship has been released. In the embodiments of the present disclosure, the method 400 is described using an example that the method 400 includes the above steps 420, 430 and 440, but the embodiments of the present disclosure are not limited thereto.

In 450, the terminal device maps the first logical channel to all carriers of a plurality of carriers according to the first indication information.

It should be understood that the plurality of carriers are all carriers in the carriers configured by the network device to the terminal device.

In 460, the terminal device maps the second logical channel to all carriers of the plurality of carriers according to the first indication information.

It should be understood that the step 460 is also optional. When the terminal device uses the second logical channel to transmit data, and the data transmitted by the second logical channel is different from the data transmitted by the first logical channel, the terminal device may map the second logical channel to all carriers, and when the second logical channel is not used to transmit data, the step 460 may not be included in the method 400.

It should also be understood that when the terminal device transmits data different from the data transmitted by the first logical channel using the second logical channel, there is no necessary sequence between the above steps 450 and 460.

Optionally, after the terminal device receives the first indication information, the terminal device may choose to immediately map the first logical channel to all carriers, or immediately map the first logical channel and the second logical channel to all of the carriers, respectively, or immediately map the first logical channel and the second logical channel to all of the carriers, respectively, or may map the first logical channel to all carriers after a preset time interval, or map the first logical channel and the second logical channel to all of the carriers respectively after a preset time interval.

In 470, the terminal device sends second indication information to the network device.

Optionally, the second indication information is used to indicate that the terminal device has mapped the first logical channel to all carriers, or the second indication information may further indicate that the terminal device has mapped the second logical channel to all carriers.

In the embodiments of the present disclosure, by receiving the indication information sent by the network device, the terminal device stops the duplication transmission of the data of one or more radio bearers, and maps the logical channel to all carriers of the plurality of carriers configured by the network device. Thus, the logical channel can transmit data on the plurality of carriers, thereby increasing the rate of data transmission.

The method embodiments of the present disclosure have been described in detail in combination with FIGS. 2-4, and the embodiments of the terminal device and the embodiments of the network device according to the embodiments of the present disclosure will be described in detail below with reference to FIG. 5 to FIG. 10. It should be understood that the embodiments of the terminal device and the embodiments of the network device correspond to the method embodiments each other, and a similar description may be referred to the method embodiments.

Figure 5:
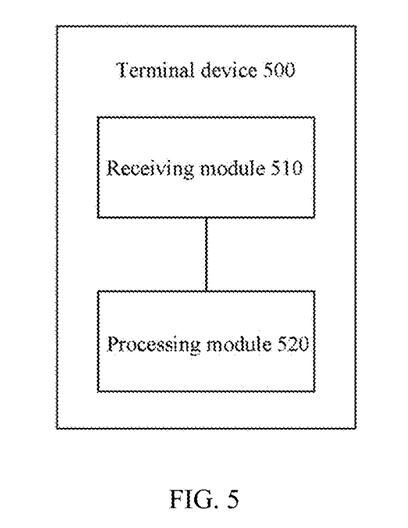
FIG. 5 is a schematic frame diagram of a terminal device according to an embodiment of the present disclosure.

FIG. 5 is a schematic block diagram of an embodiment of a terminal device 500 according to an embodiment of the present disclosure. As shown in FIG. 5, the terminal device 500 includes some or all of the following modules.

A receiving module 510 is configured to receive first indication information that is sent by the network device, where the first indication information is used to instruct the terminal device to stop duplication transmission of data of one or more radio bearers.

A processing module 520 is configured to map, according to the first indication information, the first logical channel to all carriers of a plurality of carriers, where the plurality of carriers are all carriers in carriers configured by the network device for the terminal device.

It should be understood that the first logical channel is a logical channel under one or more radio bearers. When the radio bearer is one, the first logical channel may be a plurality of logical channels under the one radio bearer, or may be the one logical channel under one radio bearer, and when the number of radio bearers is multiple, the first logical channel may be one logical channel under each radio bearer of a plurality of radio bearers, or may be a plurality of logical channels under each of the plurality of radio bearers.

That is, the first logical channel may be a plurality of logical channels or may be one logical channel.

Optionally, after the terminal device 500 receives the first indication information, the mapping relationship established when the data is transmitted by using the duplication data transmission manner may be released immediately.

It should be understood that the "release" refers to removing the mapping relationship pre-configured by the network device, or the mapping relationship pre-configured by the network device no longer exists.

That is to say, after the terminal device receives the first indication information, the terminal device may release or remove the mapping relationship established when the data is transmitted by using the duplication transmission manner by default.

Optionally, the first indication information may be carried in a Media Access Control Control Element (MAC CE).

Optionally, the processing module 520 is further configured to: according to the first indication information, map a second logical channel, after the relationship between the first logical channel and the second logical channel is released, to all carriers in the plurality of carriers.

It should be understood that the second logical channel may also be a plurality of logical channels or one logical channel.

Optionally, the processing module 520 is further configured to release, according to the first indication information, a relationship between the first logical channel and the second logical channel, and before releasing the relationship between the first logical channel and the second logical channel, the second logical channel is used to transmit the duplicated data of the data of the first logical channel.

Optionally, the processing module 520 is specifically configured to transmit the first data by using the first logical channel, transmit the second data by using the second logical channel, or stop transmitting data by using the second logical channel.

Optionally, the processing module 520 is further configured to release, according to the first indication information, a mapping relationship between the first logical channel and the first carrier that is configured in advance.

Optionally, the processing module 520 is further configured to release, according to the first indication information, a mapping relationship between the second logical channel and the second carrier that is configured in advance.

It should be understood that the second carrier may be a group of carriers or one carrier.

Figure 6:
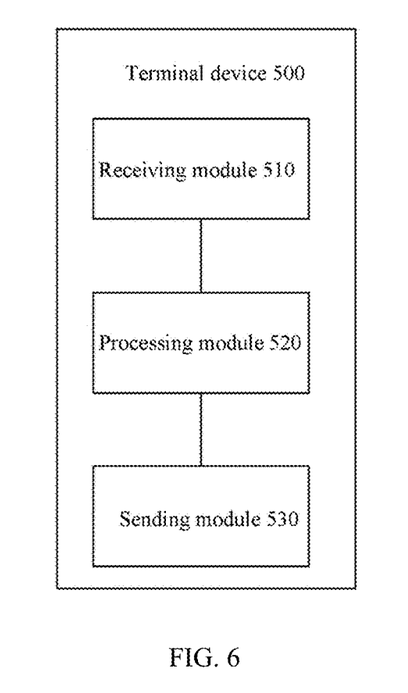
FIG. 6 is another schematic frame diagram of a terminal device according to an embodiment of the present disclosure.

Optionally, as shown in FIG. 6, the terminal device 500 further includes a sending module 530 configured to send second indication information to the network device.

Optionally, the second indication information is used to indicate that the terminal device 500 has released the first logical channel to all carriers of the plurality of carriers and/or the terminal device 500 has released the second logical channel to all carriers of the plurality of carriers. The plurality of carriers are all carriers in the carriers configured by the network device for the terminal device 500.

Optionally, the processing module 520 is further configured to, after receiving the first indication information, map the first logical channel to all carriers of the plurality of carriers within a preset time interval.

It should be understood that the terminal device 500 in the embodiments of the present disclosure may correspond to the terminal device in the method embodiments, and the foregoing and other operations and/or functions of the respective modules in the terminal device 500 respectively implement corresponding processes in respective methods in FIG. 2 to FIG. 4, which are not repeated here for brevity.

Figure 7:
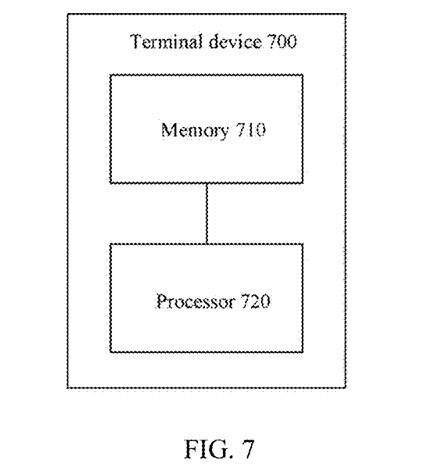
FIG. 7 is still another schematic frame diagram of a terminal device according to an embodiment of the present disclosure.

FIG. 7 is a schematic structural diagram of a terminal device 700 according to an embodiment of the present disclosure. As shown in FIG. 7, the terminal device 700 includes a memory 710 and a processor 720, and the memory 710 and the processor 720 communicate with each other via internal connection paths to deliver control and/or data signals.

The memory 710 is used to store program codes.

The processor 720 is configured to call the program codes to implement the methods in the various embodiments of the present disclosure.

In the embodiments of the present disclosure, the processor 720 may be a Central Processing Unit (CPU), a Network Processor (NP), or a combination of the CPU and the NP. The processor may further include a hardware chip. The above hardware chip may be an Application-Specific Integrated Circuit (ASIC), a Programmable Logic Device (PLD), or a combination thereof.

Embodiments of the present disclosure provide a computer readable medium for storing computer program code, the computer program including instructions for performing the method for wireless communication of the embodiments of the present disclosure described above in FIGS. 2 to 4. The readable medium may be a Read-Only Memory (ROM) or a Random Access Memory (RAM), which is not limited in the embodiments of the present disclosure.

It should be understood that the terminal device 700 according to an embodiment of the present disclosure may correspond to the terminal device in the method embodiments, and the above and other operations and/or functions of the respective modules in the terminal device 700 respectively implement the corresponding processes of respective methods in FIGS. 2 to 4, which are not described here for brevity.

Figure 8:
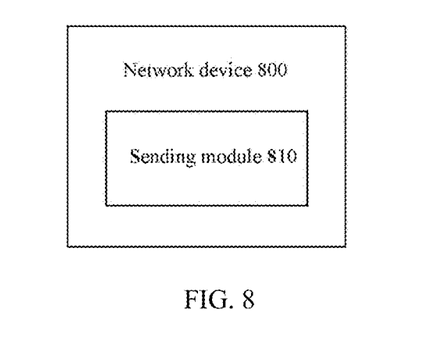
FIG. 8 is a schematic frame diagram of a network device according to an embodiment of the present disclosure.

FIG. 8 is a schematic block diagram of a network device 800 according to an embodiment of the present disclosure. As shown in FIG. 8, the network device 800 includes some or all of the following modules.

The sending module 810 is configured to send first indication information to the terminal device.

Optionally, the first indication information is used to instruct the terminal device to stop duplication transmission of data of one or more radio bearers.

Optionally, the first indication information is further used to indicate the terminal device to map the first logical channel to all carriers in the plurality of carriers, where the plurality of carriers are all carriers in the carriers configured by the network device for the terminal device.

Optionally, the first indication information is further used to indicate the terminal device to map the second logical channel, after the relationship between the first logical channel and the second logical channel is released, to all carriers in the plurality of carriers.

Optionally, the first indication information is carried in a Media Access Control Control Element (MAC CE).

Figure 9:
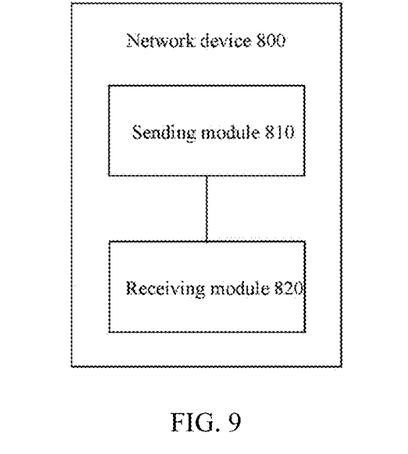
FIG. 9 is another schematic frame diagram of a network device according to an embodiment of the present disclosure.

Optionally, as shown in FIG. 9, the network device 800 further includes a receiving module 820, and the receiving module 820 is configured to receive second indication information sent by the terminal device.

Optionally, the second indication information is used to indicate that the terminal device has released the first logical channel to all carriers of the plurality of carriers and/or the terminal device has released the second logical channel to all carriers of the plurality of carriers. The plurality of carriers are all carriers in the carriers configured by the network device 800 for the terminal device.

Figure 10:
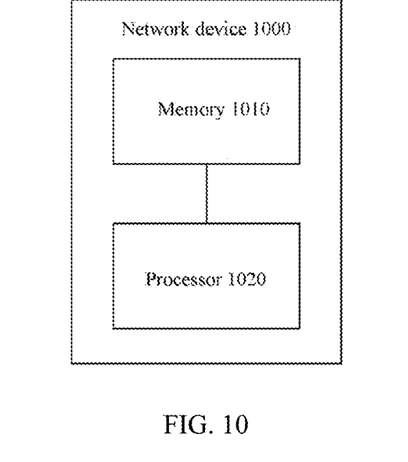
FIG. 10 is still another schematic frame diagram of a network device according to an embodiment of the present disclosure.

FIG. 10 is a schematic structural diagram of a network device 1000 according to an embodiment of the present disclosure. As shown in FIG. 10, the network device 1000 includes a memory 1010 and a processor 1020, and the memory 1010 and the processor 1020 communicate with each other via internal connection paths to deliver control and/or data signals.

The memory 1010 is configured to store program codes.

The processor 1020 is configured to call the program codes to implement the methods in the various embodiments of the present disclosure.

In the embodiments of the present disclosure, the processor 720 may be a Central Processing Unit (CPU), a Network Processor (NP), or a combination of the CPU and the NP. The processor may further include a hardware chip. The above hardware chip may be an Application-Specific Integrated Circuit (ASIC), a Programmable Logic Device (PLD), or a combination thereof.

Embodiments of the present disclosure provide a computer readable medium for storing computer program code, the computer program including instructions for performing the method for wireless communication of the embodiments of the present disclosure described above in FIGS. 2 to 4. The readable medium may be a Read-Only Memory (ROM) or a Random Access Memory (RAM), which is not limited in the embodiments of the present disclosure.

It should be understood that the network device 1000 according to an embodiment of the present disclosure may correspond to the network device in the method embodiments, and the above and other operations and/or functions of the respective modules in the network device 1000 respectively implement the corresponding processes of respective methods in FIGS. 2 to 4, which are not described here for brevity.

Embodiments of the present disclosure further provide a system chip, the system chip includes an input and output interface, at least one processor, at least one memory, and a bus, the at least one memory is configured to store an instruction, and the at least one processor is configured to call the instruction of the at least one memory to perform the operations of the methods in the various aspects described above.

It should be understood that the term "and/or" in the present disclosure is merely used for describing an association between the associated objects, indicating that there may be three relationships, for example, A and/or B may indicate the following three situations: A exists separately, both A and B exist at the same time, and B exists separately. In addition, the character "/" in the present disclosure generally indicates that the contextual objects has an "or" relationship.

Those of ordinary skills in the art may be aware that, the units and algorithm steps of individual examples described in combination with the embodiments disclosed herein, may be implemented by electronic hardware or a combination of computer software and the electronic hardware. Whether the functions are performed by hardware or software depends on particular applications and design constraint conditions of the technical solutions. Those of ordinary skills in the art may use different methods to implement the described functions for each particular application, but it should not be considered that the implementation goes beyond the scope of the present application.

It may be clearly understood by those of ordinary skills in the art that, for the purpose of convenient and brief description, for a detailed working process of the foregoing systems, devices, and units, reference may be made to a corresponding process in the foregoing method embodiments, and details are not described herein again.

In the several embodiments provided in the present application, it should be understood that the disclosed systems, devices and methods may be implemented in other ways. For example, the device embodiments described above are merely illustrative. For example, the division of the units is only one kind of logical function division. In practice, there may be other division manner. For example, a plurality of units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, they may be located in one place, or may be distributed on a plurality of network units. Some or all of the units may be selected according to actual needs to achieve the objectives of the solutions in the embodiments.

In addition, each functional unit in each embodiment of the present disclosure may be integrated in one processing unit, or each unit may exist alone physically, or two or more units may be integrated in one unit.

The above embodiments of the present disclosure may be all or partially implemented by hardware, software, firmware, or any combination thereof. When being implemented by software, the embodiments may be all or partially implemented in form of computer program products. The computer program products include one or more computer instructions. When the computer program instructions are loaded and executed on a computer, the flows or functions described according to the embodiments of the present disclosure are generated in whole or in part. The computer may be a general-purpose computer, a special-purpose computer, a computer network, or other programmable apparatus. The computer instructions may be stored in a computer readable storage medium or transferred from one computer readable storage medium to another computer readable storage medium. For example, the computer instructions may be transferred from a website, a computer, a server or a data center to another website, computer, server, or data center by wire (e.g., coaxial cable, fiber optic, Digital Subscriber Line (DSL)) or wireless way (e.g., infrared, wireless, microwave, etc.). The computer readable storage medium may be any available medium that can be accessed by a computer or a data storage device such as a server, a data center, or the like that includes one or more available mediums. The available medium may be a magnetic medium (e.g., a floppy disk, a hard disk, a magnetic tape), an optical medium (e.g., a DVD), or a semiconductor medium (e.g. a Solid State Disk (SSD)), etc.

The foregoing descriptions are merely detailed embodiments of the present disclosure, and the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be subjected to the protection scope of the claims.

What is claimed is:

1. A method for wireless communication, comprising:
configuring data duplication for a first logical channel and a second logical channel;
configuring, by a terminal device, a mapping relationship between the first logical channel and a first carrier for transmitting data of the first logical channel;
configuring, by the terminal device, a mapping relationship between the second logical channel and a second carrier for transmitting data of the second logical channel; wherein the first carrier and the second carrier are different;
performing, by the terminal device, duplication transmission of data of one or more radio bearers, wherein a Packet Data Convergence Protocol (PDCP) packet data unit (PDU) is duplicated, and the PDCP PDU is transmitted in the first logical channel, and the duplication of the PDCP PDU is transmitted in the second logical channel;
receiving, by the terminal device, first indication information sent by a network device, wherein the first indication information is used to indicate to the terminal device to stop duplication transmission of data of one or more radio bearers;
releasing, by the terminal device, the mapping relationship between the first logical channel and the first carrier according to the first indication information;
releasing, by the terminal device, the mapping relationship between the second logical channel and the second carrier according to the first indication information;
mapping the first logical channel to all carriers of a plurality of carriers according to the first indication information;
mapping the second logical channel to all carriers of the plurality of carriers according to the first indication information; and continue to transmit data on the first logical channel and the second logical channel respectively; wherein the transmission of data on the first logical channel and the second logical channel is not affected, wherein the data transmitted by the second logical channel is different from the data transmitted by the first logical channel.

2. The method according to claim 1, further comprising:
sending, by the terminal device, second indication information to the network device, wherein the second indication information is used to indicate that the terminal device has released the first logical channel to all carriers of the plurality of carriers and/or the terminal device has released the second logical channel to all carriers of the plurality of carriers.

3. The method according to claim 1, wherein the mapping, by the terminal device, the first logical channel to all carriers of the plurality of carriers according to the first indication information comprises:
mapping, by the terminal device, the first logical channel to all carriers of the plurality of carriers within a preset time interval after receiving the first indication information.

4. The method according to claim 1, wherein the first indication information is carried in a Media Access Control Control Element (MAC CE).

5. A method for wireless communication, comprising:
sending, by a network device, first indication information to a terminal device, wherein the first indication information is used to indicate to the terminal device to stop duplication transmission of data of one or more radio bearers, release a mapping relationship between a first logical channel for transmitting a Packet Data Convergence Protocol (PDCP) packet data unit (PDU) and a first carrier for transmitting data of the first logical channel, and release a mapping relationship between a second logical channel for transmitting a duplication of the PDCP PDU and a second carrier for transmitting data of the second logical channel, wherein the first carrier and the second carrier are different, and wherein the first indication information is further used to map the first logical channel to all carriers of a plurality of carriers, map the second logical channel to all carriers of the plurality of carriers, and continue to transmit data on the first logical channel and the second logical channel respectively, wherein the transmission of data on the first logical channel and the second logical channel is not affected, wherein the data transmitted by the second logical channel is different from the data transmitted by the first logical channel.

6. The method according to claim 5, further comprising:
receiving, by the network device, second indication information that is sent by the terminal device, wherein the second indication information is used to indicate that the terminal device has released the first logical channel to all carriers of the plurality of carriers and/or the terminal device has released the second logical channel to all carriers of the plurality of carriers.

7. The method according to claim 5, wherein the first indication information is carried in a Media Access Control Control Element (MAC CE).

8. A terminal device, comprising:
a non-transitory memory; and
a processor;
wherein the non-transitory memory stores program code, which when executed by the processor, causes the processor to:
configure data duplication for a first logical channel and a second logical channel;
configure a mapping relationship between the first logical channel and a first carrier for transmitting data of the first logical channel;
configure a mapping relationship between the second logical channel and a second carrier for transmitting data of the second logical channel; wherein the first carrier and the second carrier are different;
perform duplication transmission of data of one or more radio bearers, wherein a Packet Data Convergence Protocol (PDCP) packet data unit (PDU) is duplicated, and the PDCP PDU is transmitted in the first logical channel, and the duplication of the PDCP PDU is transmitted in the second logical channel;

receive first indication information sent by a network device, wherein the first indication information is used to indicate to the terminal device to stop duplication transmission of data of one or more radio bearers;
release the mapping relationship between the first logical channel and the first carrier according to the first indication information;
release the mapping relationship between the second logical channel and the second carrier according to the first indication information;
map the first logical channel to all carriers of a plurality of carriers according to the first indication information;
map the second logical channel to all carriers of the plurality of carriers according to the first indication information; and continue to
transmit data on the first logical channel and the second logical channel respectively, wherein the transmission of data on the first logical channel and the second logical channel is not affected, wherein the data transmitted by the second logical channel is different from the data transmitted by the first logical channel.

9. The terminal device according to claim 8, wherein the non-transitory memory stores program code, which when executed by the processor, causes the processor to:
send second indication information to the network device, wherein the second indication information is used to indicate that the terminal device has released the first logical channel to all carriers of the plurality of carriers and/or the terminal device has released the second logical channel to all carriers of the plurality of carriers.

10. The terminal device according to claim 8, wherein the non-transitory memory stores program code, which when executed by the processor, causes the processor to map the first logical channel to all carriers of the plurality of carriers in a preset time interval after receiving the first indication information.

11. The terminal device according to claim 8, wherein the first indication information is carried in a Media Access Control Control Element (MAC CE).

12. A network device, comprising:
a non-transitory memory; and
a processor;
wherein the non-transitory memory stores program code, which when executed by the processor, causes the processor to:
send first indication information to a terminal device, wherein the first indication information is used to indicate to the terminal device to stop duplication transmission of data of one or more radio bearers, release a mapping relationship between a first logical channel for transmitting a Packet Data Convergence Protocol (PDCP) packet data unit (PDU) and a first carrier for transmitting data of the first logical channel, and release a mapping relationship between a second logical channel for transmitting a duplication of the PDCP PDU and a second carrier for transmitting data of the second logical channel, wherein the first carrier and the second carrier are different, and wherein the first indication information is further used to map the first logical channel to all carriers of a plurality of carriers, map the second logical channel to all carriers of the plurality of carriers, and continue to transmit data on the first logical channel and the second logical channel respectively, wherein the transmission of data on the first logical channel and the second logical channel is not affected, wherein the data transmitted by the second logical channel is different from the data transmitted by the first logical channel.

13. The network device according to claim 12, wherein the non-transitory memory stores program code, which when executed by the processor, causes the processor to:
receive second indication information that is sent by the terminal device, wherein the second indication information is used to indicate that the terminal device has released the first logical channel to all carriers of the plurality of carriers and/or the terminal device has released the second logical channel to all carriers of the plurality of carriers.

14. The network device according to claim 12, wherein the first indication information is carried in a Media Access Control Control Element (MAC CE).

* * * * *